(12) United States Patent
Jalbert

(10) Patent No.: US 11,284,977 B1
(45) Date of Patent: Mar. 29, 2022

(54) ADJUSTABLE DENTAL-FLOSS APPARATUS

(71) Applicant: Vincent Paul Jalbert, East Lyme, CT (US)

(72) Inventor: Vincent Paul Jalbert, East Lyme, CT (US)

( * ) Notice: Subject to any disclaimer, the term of this patent is extended or adjusted under 35 U.S.C. 154(b) by 0 days.

(21) Appl. No.: 17/445,191

(22) Filed: Aug. 16, 2021

Related U.S. Application Data

(60) Provisional application No. 63/202,708, filed on Jun. 22, 2021.

(51) Int. Cl.
*A61C 15/00* (2006.01)
*A61C 15/04* (2006.01)

(52) U.S. Cl.
CPC ................... *A61C 15/046* (2013.01)

(58) Field of Classification Search
CPC ....... A61C 15/00; A61C 15/04; A61C 15/045; A61C 15/046
See application file for complete search history.

(56) References Cited

U.S. PATENT DOCUMENTS

| | | | | |
|---|---|---|---|---|
| 2,047,456 A | * | 7/1936 | Barsch ................. | A61C 15/046 132/325 |
| 3,998,236 A | * | 12/1976 | Koo ..................... | A61C 15/046 132/324 |
| 6,155,274 A | * | 12/2000 | Stein .................... | A61C 15/046 132/326 |
| 2021/0052357 A1 | * | 2/2021 | Xu ....................... | A61C 15/046 |

* cited by examiner

*Primary Examiner* — Rachel R Steitz

(57) ABSTRACT

The present disclosure refers to an apparatus for flossing teeth having a handle with a fixed anchor point for holding one end of a length of dental floss that passes through an eyelet and is affixed to a breakaway anchor tab on a lever. Breaking the breakaway anchor tab releases one end of the floss so that it may be pulled through a space between teeth. An adjustment lever allows for the easy transition of the flossing loop from tight for the insertion process to slack to enable the flossing process. The guidelines for flossing require that the flossing loop should form the required "C" shape around the base of the tooth.

5 Claims, 7 Drawing Sheets

100

ADJUSTABLE DENTAL-FLOSS APPARATUS

TECHNICAL FIELD

The invention relates in general to dental instruments, and more specifically to structures for holding dental floss.

BACKGROUND

Flossing with string floss is difficult for some people, partly due to the requirement of two hands to manipulate the floss. Disposable dental flossers hold a short length of dental floss between two fixed points. These flossers enable people with physical limitations to floss their teeth, and/or to floss more easily and possibly more often than they otherwise would.

The flossing process typically involves holding a length of floss tightly and inserting it between the teeth. Tightly spaced teeth require forceful insertion, risking injury to gums. To control the floss and minimize risk of injury, the floss must be tightly held during insertion between the teeth.

Currently-available, disposable dental flossers provide a tightly held length of dental floss between two fixed points. This arrangement facilitates insertion and adequate control of the floss, but it falls short of facilitating thorough and proper flossing. The American Dental Association (ADA) recommends inserted floss to be wrapped around the base of the tooth at the gum line to form a "C" shape. A flosser with a fixed floss length does not have enough slack in the floss loop to form the required "C" shape around the base of the tooth.

Floss can become snagged between complex dental features like cracks, broken fillings, or cavities. When this happens, the recommendation is to release one end of the floss so that it can be pulled through the complex dental features to prevent injury or damage to the tooth. If this type of snag happens while using a flossing device, the recommendation is to cut the floss with scissors and then remove it by sliding it past the complex dental feature. This requires having access to scissors, and being comfortable cutting something in one's mouth. In addition, scissors are usually unsanitary and inappropriate for putting in the mouth.

SUMMARY

The present disclosure refers to an apparatus for flossing teeth that holds a length of dental floss between a first anchor point, passing through an eyelet and attaching to a breakaway anchor tab. Breaking the breakaway anchor tab releases one end of the length of dental floss so that it may be pulled through the space between teeth to remove the dental floss that has snagged on a complex dental feature. In some cases, such as with those who have tightly spaced teeth, the breakaway anchor tab may enable easier removal of the floss, even when it is not snagged. In some iterations, an adjustment lever allows for the easy transition of the flossing loop from tight for the insertion process to slack to enable the flossing process. The guidelines for flossing require that the flossing loop should form the required "C" shape around the base of the tooth.

DESCRIPTION

Figure 1:
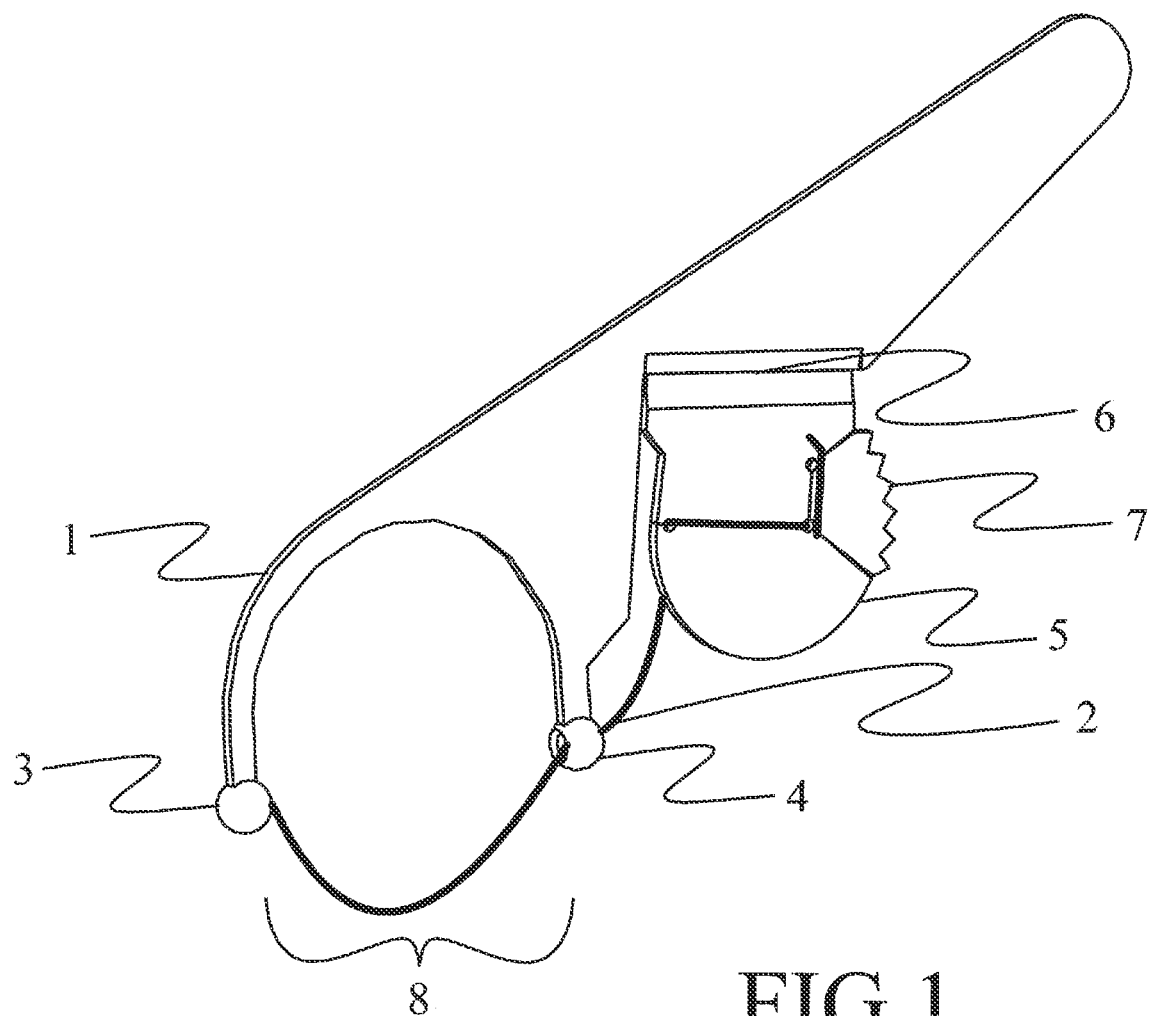
FIG. 1 is a perspective view of an example embodiment of the present disclosure.

FIG. 1 shows a perspective view of an example embodiment 100 with a slack flossing loop 8. A handle 1 has a structure that supports a length of dental floss 2. The handle 1 includes an anchor point 3 and an eyelet 4. The length of dental floss 2 is attached to a fixed anchor point 3 and passes through eyelet 4 creating a flossing loop 8. After passing through eyelet 4, the dental floss 2 then passes through a paddle-shaped lever 5, where it is affixed to a breakaway anchor tab 7. The paddle-shaped lever 5 is joined to the handle 1 at a hinge 6. One skilled in the art is familiar with hinges made of contiguous material such as molded-plastic living hinges and the like.

Figure 2:
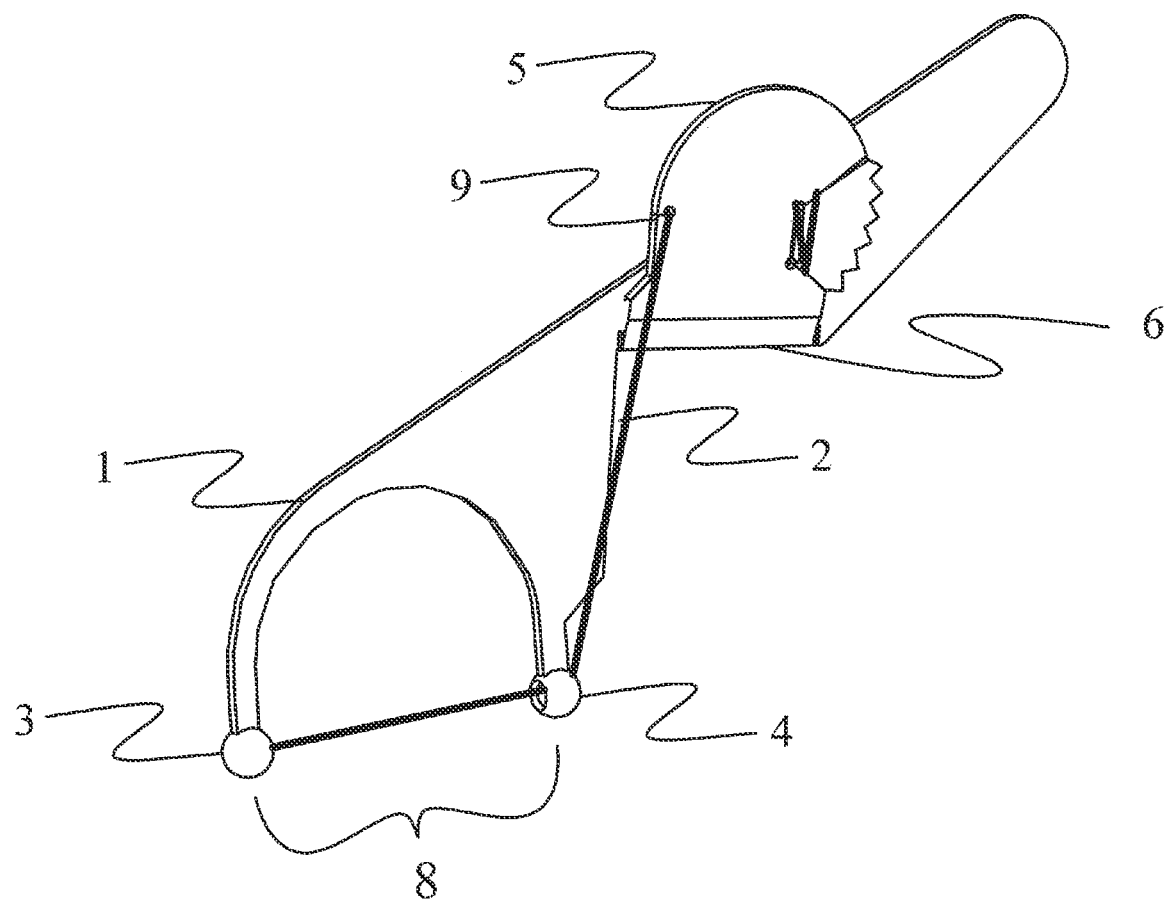
FIG. 2 is perspective view of the example embodiment in a tensioned state.
Figure 3:
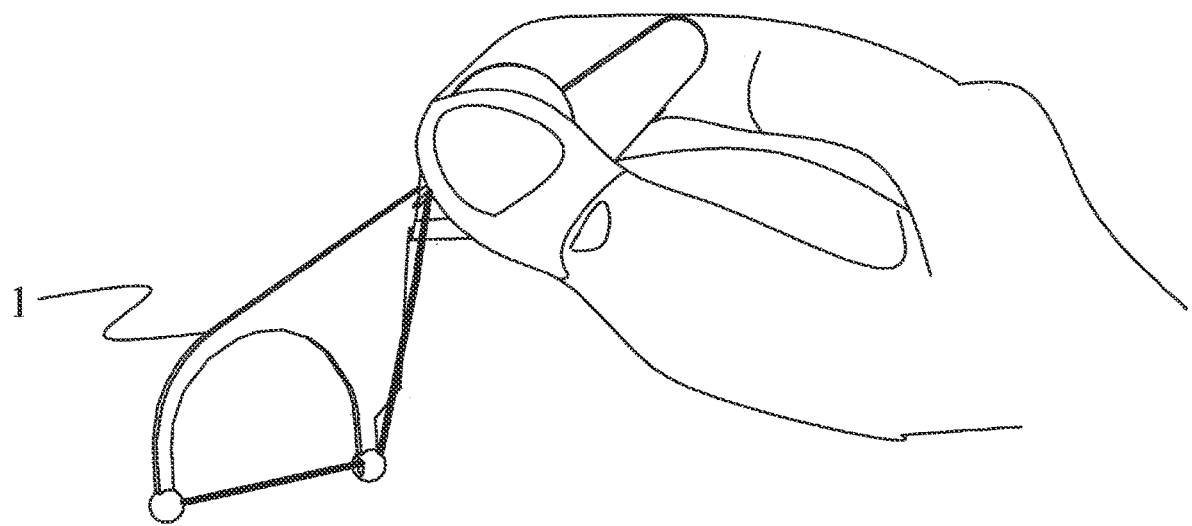
FIG. 3 is a perspective view showing the operation of a drive mechanism of the example embodiment.

FIGS. 2 and 3 show a perspective view of an example embodiment 100 in which a tensioned flossing loop 8 can be manipulated to be taut or slack. The paddle-shaped lever 5 is shown flexed upward about hinge 6 for the purpose of slackening or tightening flossing loop 8. Here, the paddle-shaped lever 5 has been pressed upward, approaching but not touching handle 1. With the tool in hand, the paddle-shaped lever 5 may be pressed upward by one's thumb (FIG. 3). The pressing of the paddle-shaped lever 5 decreases the slackness of the flossing loop 8 while leaving the total length of dental floss 2 constant. The apparatus may be held as shown in FIG. 3 while the flossing loop 8 is inserted between teeth. Once the flossing loop 8 is positioned between teeth, the user may reduce pressure on the paddle-shaped lever 5 to slacken the flossing loop 8. With slack in the flossing loop 8, the floss can assume the desired "C" shape around the base of a tooth. One skilled in the art understands that a "C" shaped flossing configuration more effectively reaches varying tooth surfaces or complex tooth features than that of a straight line of floss. One skilled in the art also understands that the paddle-shaped lever 5 may be pressed to once again increase tension in the flossing loop 8 to remove the floss from between teeth.

Figure 4:
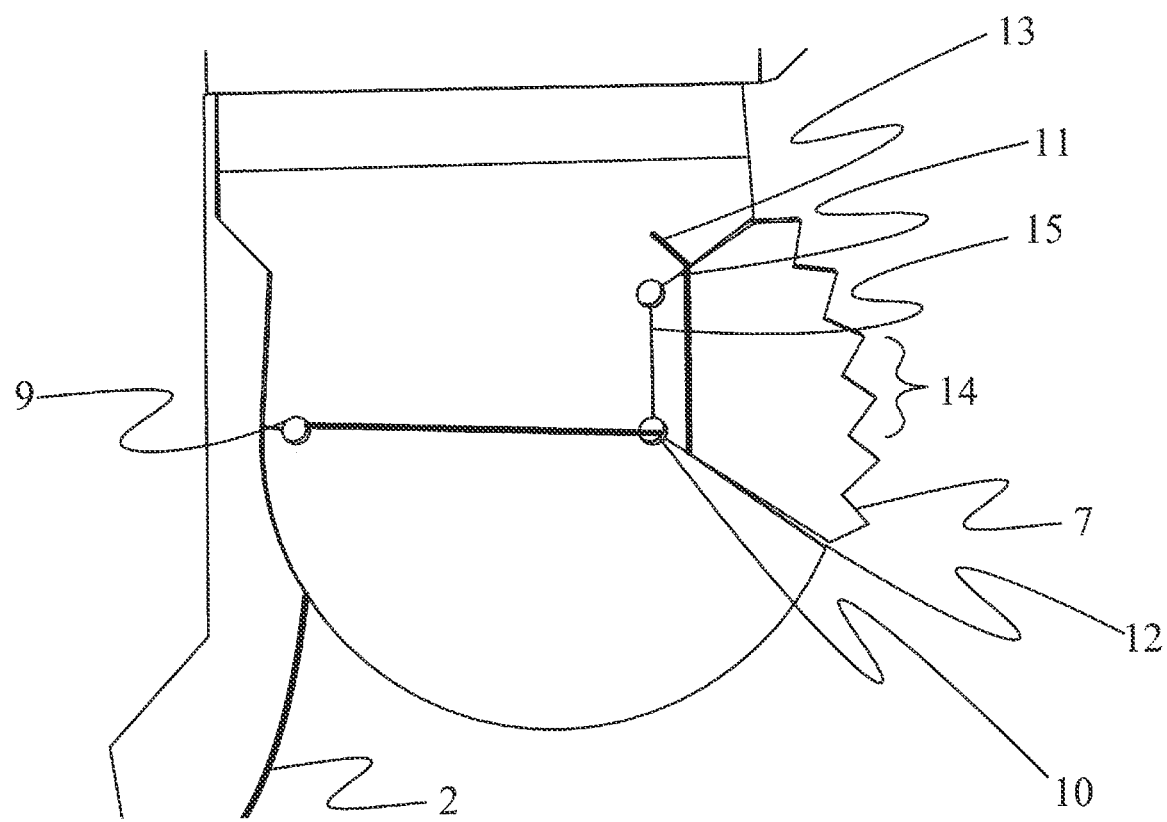
FIG. 4 is a perspective view of the details of a breakaway anchor tab.

FIG. 4 shows a detail view of a breakaway anchor tab 7 and the method by which the dental floss 2 is secured to it. The breakaway anchor tab 7 is a jam cleat having a living hinge 15 and a break seam 11. A jam cleat 12 is a space with an acute angle. Dental floss 2 forced into the apex of the acute-angled opening (jam cleat) 12 is held fast in the jam cleat 12. The floss 2 is threaded through the eyelet 4 (FIG. 1), through a first routing hole 9 and through a second routing hole 10 at which point it is forced into jam cleat 12 disposed at either end of the breakaway anchor tab 7. The loose end 13 of the dental floss 2 is exposed. One skilled in the art understands how a line is held in a jam cleat. One skilled in the art also understands how a break seam 11 or a jam cleat may be molded into a plastic form, and that a break seam 11 may be constructed as a pre-scored portion that enables breaking of a section along it.

In some embodiments a routing hole, such as routing hole 9 or routing hole 10, may be a slot or other type of leverage point. One skilled in the art is familiar with various methods and apparatuses for affecting a length of dental floss to provide leverage. A term for a feature that provides leverage is referred to as "leverage point."

Both the paddle-shaped lever 5 (FIG. 1) and the breakaway anchor tab 7 (FIG. 4) are designed to be operated by feel, with tactile features to discern one from the other. The breakaway anchor tab 7 has a toothed edge 14. It also has a different axis of rotation and a different direction of operation than that of the paddle-shaped lever 5. Each hole in the paddle-shaped lever has a smooth inner diameter to enable floss to slide through.

Figure 5:
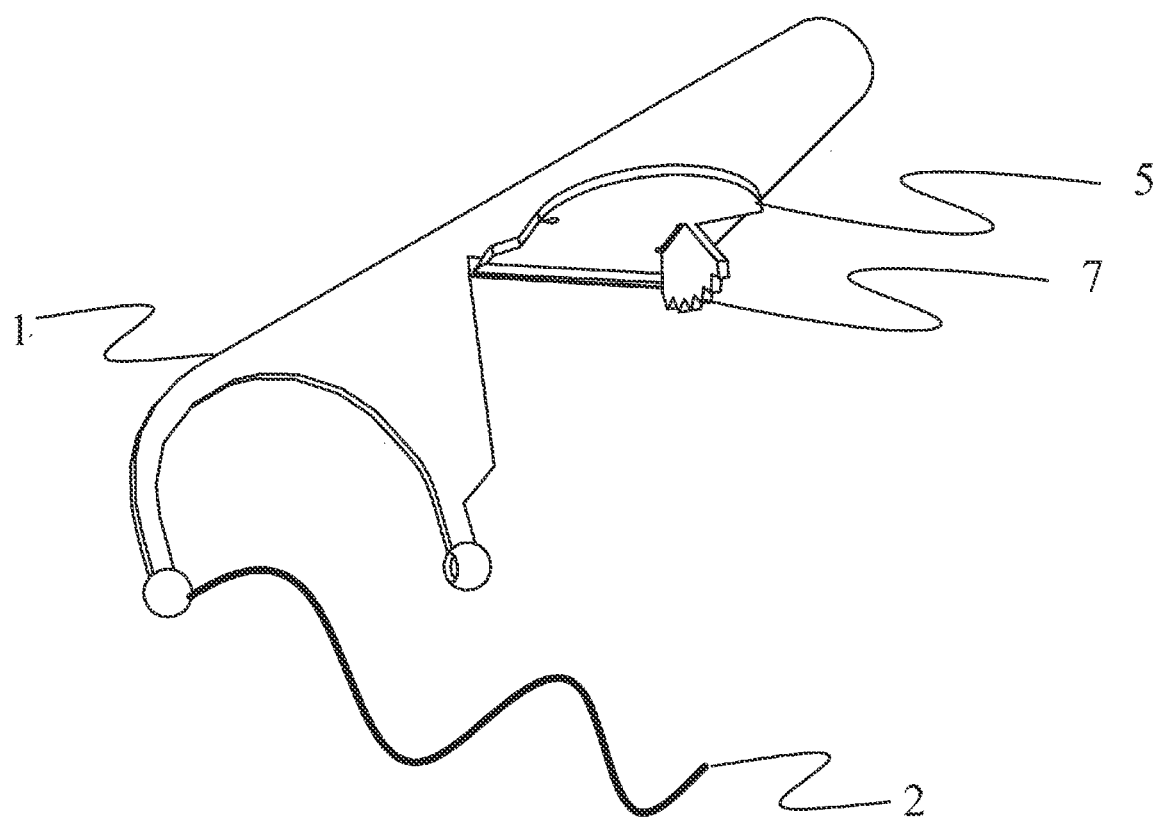
FIG. 5 is a perspective view of the adjustable dental flosser shown with the floss released.

In FIG. 5 an example embodiment 100 is shown with a breakaway anchor tab 7 broken off. The dental floss 2 is shown pulled free of the guide holes 9 and 10 (FIG. 4) and the eyelet 4 (FIG. 2). Once the breakaway anchor tab 7 is released in this manner the floss may be released from a tight space between teeth by pulling the loose end 13 (FIG. 4) through and out.

Figure 6:
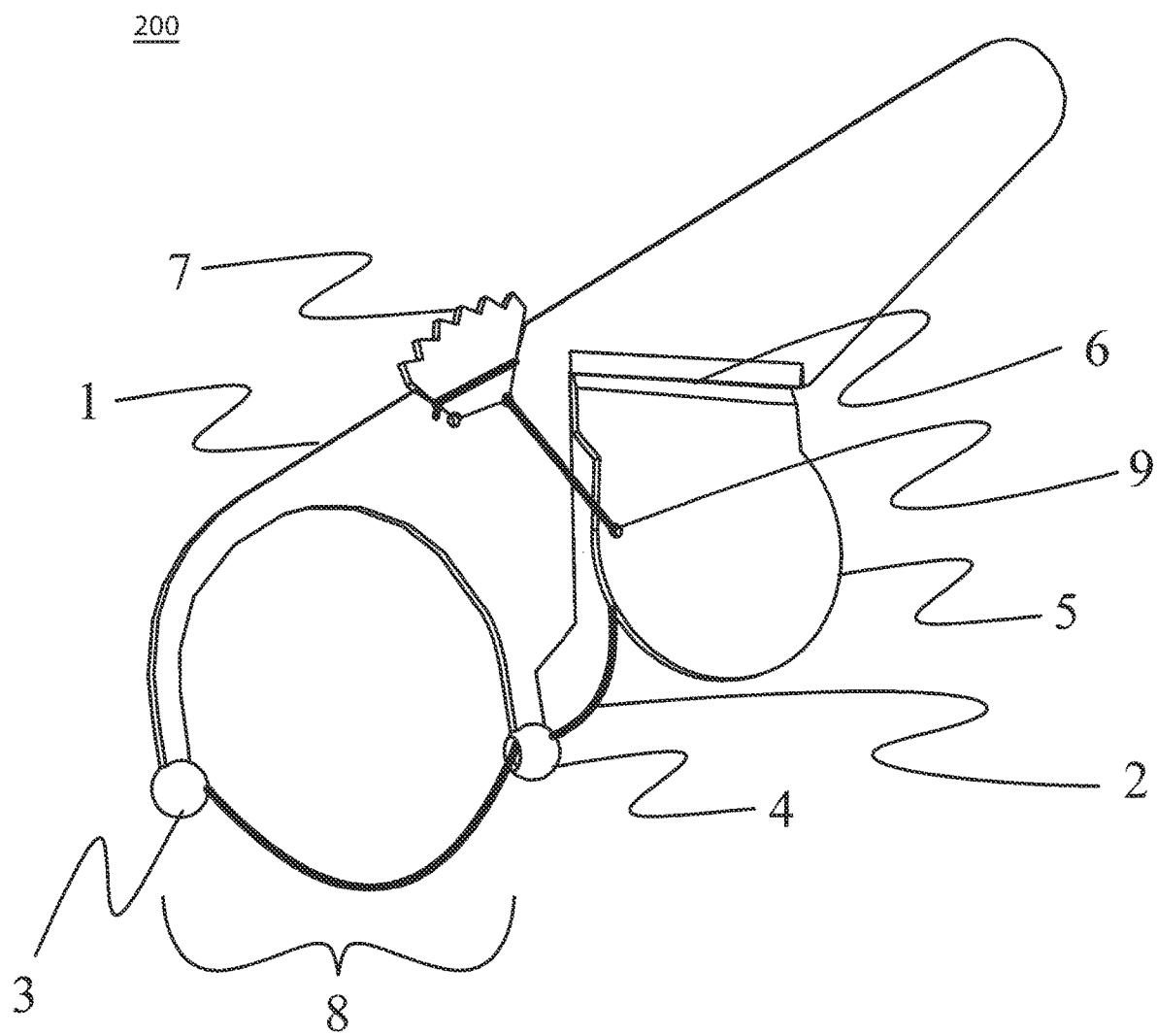
FIG. 6 is a perspective view of a second iteration of the embodiment.

FIG. 6 shows a perspective view of a second iteration 200 with a slack flossing loop 8. A handle 1 has a structure that supports a length of dental floss 2. The handle 1 includes an anchor point 3 and an eyelet 4. The length of dental floss 2 is affixed to a fixed anchor point 3 and passes through eyelet 4 creating a flossing loop 8. After passing through eyelet 4, the dental floss 2 passes through a routing hole 9 in a paddle-shaped lever 5, where it is affixed to a breakaway anchor tab 7. The paddle-shaped lever 5 is joined to the handle 1 at a hinge 6. One skilled in the art is familiar with hinges made of contiguous material such as molded plastic living hinges. The breakaway anchor tab 7 is affixed to the handle 1. Breaking the breakaway anchor tab 7 releases the end of the dental floss 2 so that it may be drawn through teeth and removed.

Figure 7:
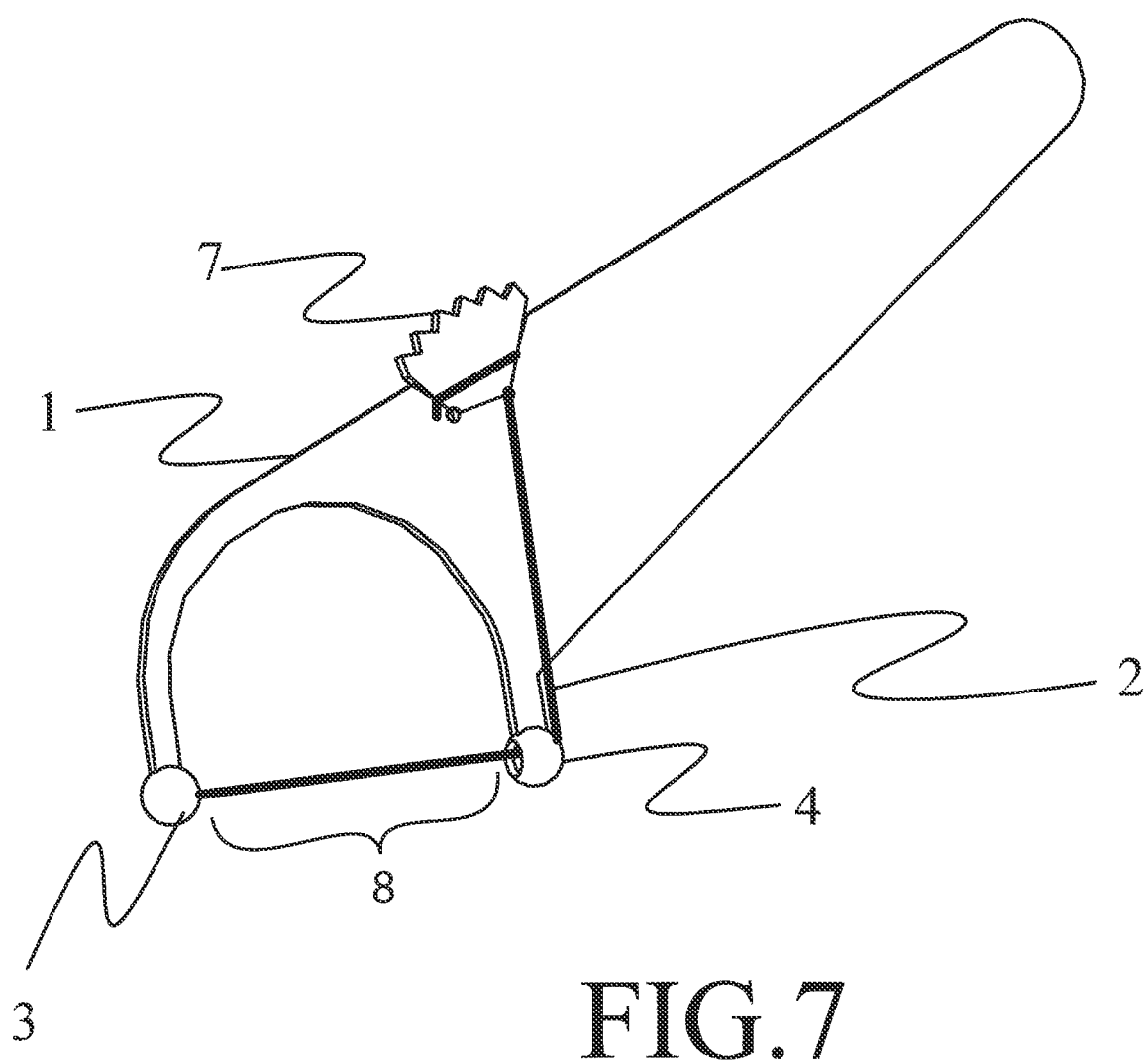
FIG. 7 is a perspective view of a third iteration of the embodiment.

FIG. 7 shows a perspective view of a third iteration 300 with a flossing loop 8. A handle 1 has a structure that supports a length of dental floss 2. The handle 1 includes an anchor point 3 and an eyelet 4. The length of dental floss 2 is affixed to a fixed anchor point 3 and passes through eyelet 4 creating a flossing loop 8. After passing through eyelet 4, the dental floss 2 is affixed to a breakaway anchor tab 7. The breakaway anchor tab 7 is affixed to the handle 1. Breaking the breakaway anchor tab 7 releases the end of the dental floss 2 so that it may be drawn through teeth and removed.

These embodiments are intended to define but not limit the invention.

The invention claimed is:

1. An apparatus for flossing teeth comprising:
    a handle having a fixed anchor point and an eyelet; and
    a lever hingedly engaged with said handle having a breakaway anchor tab; and
    a jam cleat formed by said breakaway anchor tab and said lever; and
    a length of dental floss fixedly engaged with said fixed anchor point, passing through said eyelet and fixedly engaged with said breakaway anchor tab passes through said jam cleat; wherein
    the lever may be moved to adjust the slackness of said dental floss between said fixed anchor point and eyelet; and breaking said breakaway anchor tab opens said jam cleat, freeing said dental floss from engagement with said breakaway anchor tab, allowing the dental floss to be pulled through and out of a space between teeth.

2. The apparatus for flossing teeth of claim 1 further comprising:
    a textured surface on at least a portion of said breakaway anchor tab; wherein
    a user may find said breakaway anchor tab by feel alone.

3. The apparatus for flossing teeth of claim 1 further comprising:
    a pre-scored portion of said breakaway anchor tab; wherein
    applying force on said breakaway anchor tab causes said breakaway anchor tab to break along said pre-scored portion.

4. The apparatus of claim 1 further comprising:
    a lever hingedly engaged with said handle; and
    said lever having at least one leverage point wherein
    said dental floss passes through said at least one leverage point between said eyelet and said breakaway anchor tab such that movement of said lever changes the slackness of said dental floss.

5. An apparatus for flossing teeth comprising:
    a handle having a fixed anchor point and an eyelet; and
    a lever hingedly engaged with said handle having a breakaway anchor tab; and
    a textured surface on at least a portion of said breakaway anchor tab; and
    a jam cleat formed by said breakaway anchor tab and said lever: and
    at least a portion of said breakaway anchor tab having a pre-scored seam; and
    a length of dental floss fixedly engaged with said anchor point, passing through said eyelet and wrapping around said breakaway anchor tab through said jam cleat and being fixedly engaged with said breakaway anchor tab; wherein
    the lever may be moved to adjust the slackness of said dental floss between said anchor point and eyelet; and a user may find said breakaway anchor tab by feel alone; and dental floss is fixedly engaged with said breakaway anchor tab by being wrapped around said breakaway anchor tab and passing through said jam cleat; and wherein breaking said breakaway anchor tab opens said jam cleat freeing said dental floss from engagement with said breakaway anchor tab, allowing the dental floss to be pulled through and out of a space between teeth.

* * * * *